(12) United States Patent
Kiguchi et al.

(10) Patent No.: US 6,593,382 B2
(45) Date of Patent: Jul. 15, 2003

(54) POLYOLEFIN RESIN PRE-EXPANDED PARTICLES AND PROCESS FOR PREPARING THE SAME

(75) Inventors: Taro Kiguchi, Settsu (JP); Tomonori Iwamoto, Settsu (JP); Kenichi Senda, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/058,077

(22) Filed: Jan. 29, 2002

(65) Prior Publication Data

US 2002/0143076 A1 Oct. 3, 2002

(30) Foreign Application Priority Data

Feb. 1, 2001 (JP) ........................................ 2001-025174

(51) Int. Cl.$^7$ ................................ C08J 9/18; C08J 9/22
(52) U.S. Cl. .......................................... 521/58; 521/56
(58) Field of Search ...................... 521/58, 56

(56) References Cited

U.S. PATENT DOCUMENTS

| | | | |
|---|---|---|---|
| 5,716,998 A | * | 2/1998 | Munakata |
| 5,883,141 A | * | 3/1999 | Mihayashi et al. |
| 6,013,687 A | | 1/2000 | Wirobski et al. ............. 521/60 |
| 6,326,409 B1 | * | 12/2001 | Mihayashi et al. |

FOREIGN PATENT DOCUMENTS

| | | |
|---|---|---|
| JP | 05-179049 | 7/1993 |
| JP | 07-165973 | 6/1995 |
| JP | 07-165974 | 6/1995 |
| JP | 08-20662 | 1/1996 |

\* cited by examiner

Primary Examiner—Morton Foelak
(74) Attorney, Agent, or Firm—Armstrong, Westerman & Hattori, LLP

(57) ABSTRACT

Polyolefin resin pre-expanded particles having two fusion peaks on DSC curve wherein the proportion of the heat of fusion Qh of the peak appearing on the high temperature side based on the total heat of fusion of the two peaks represented by the equation: $[Qh/(Ql+Qh)] \times 100$ falls within the range of 10 to 60% in which Ql is the heat of fusion of the peak appearing on the low temperature side, and the standard deviation of said proportion is not more than 1.2. The pre-expanded particles are prepared by releasing an aqueous dispersion of resin particles impregnated with a blowing agent from a vessel into an atmosphere of lower pressure than the inner pressure of the vessel to expand the particles, while stepwise or continuously raising the inner temperature or the inner pressure of the vessel at a specific rate, and can be molded with stable molding cycle to give cellular molded articles having stable dimensions.

2 Claims, 1 Drawing Sheet

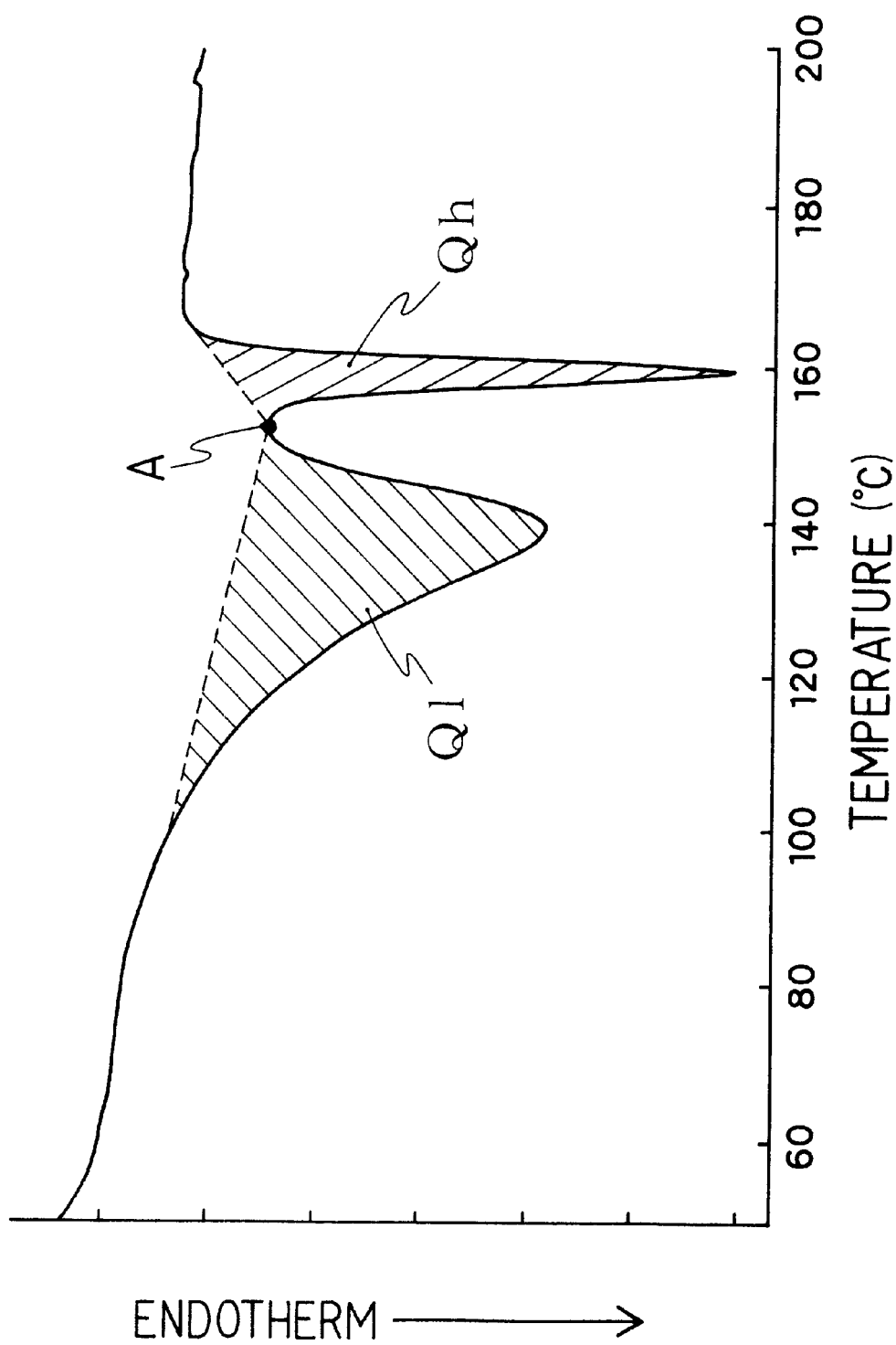

POLYOLEFIN RESIN PRE-EXPANDED PARTICLES AND PROCESS FOR PREPARING THE SAME

BACKGROUND OF THE INVENTION

The present invention relates to pre-expanded particles of a polyolefin resin and a process for preparing the same. More particularly, the present invention relates to polyolefin resin pre-expanded particles suitable for use in an in-mold foaming method wherein in-mold foamed articles are prepared by filling polyolefin resin pre-expanded particles in a mold capable of being closed but incapable of being hermetically sealed and heating the particles with a heating medium such as steam to fuse them together, and a process for preparing the pre-expanded particles.

Polyolefin foamed articles are superior in chemical resistance, heat resistance and distortion restoration rate after compression as compared to polystyrene foamed articles. Also, in-mold molding of polyolefin pre-expanded particles has the advantage that foamed articles having a complicated shape can be prepared. For these reasons, polyolefin in-mold foamed articles have been popularly used in various fields, for examples, as cushioning packaging materials, returnable delivery boxes and automobile bumper cores.

If a polyolefin resin is heat-treated at a temperature in the vicinity of its melting point, the crystal structure changes to reveal two fusion peaks when measured by differential scanning calorimetry (DSC). JP-A-59-176336 discloses that polyolefin pre-expanded particles prepared by a method which comprises charging polyolefin resin particles, an aqueous dispersion medium containing a dispersing agent and a dispersing aid, and a blowing agent in a pressure vessel, heating the resulting dispersion with stirring to a prescribed pressure and a prescribed temperature, and releasing the dispersion into a low pressure atmosphere to thereby expand the particles (the method being hereinafter referred to as "pressure release expansion method"), are required to have a crystal structure having two fusion peaks as observed on the DSC curve in obtaining good in-mold foaming products.

Further, it is proposed to improve the moldability of polyolefin pre-expanded particles by defining the heat of fusion of a peak appearing on the higher temperature side of the DSC curve of the pre-expanded particles within a specific range with respect to each kind of resins. For examples, it is disclosed that the moldability is improved when the heat of fusion of the high-temperature-side peak of polyethylene resin pre-expanded particles falls within the range of not less than 5 J/g (JP-A-64-1741), when the heat of fusion of the high-temperature-side peak of polyethylene resin pre-expanded particles falls within the range of 8 to 25.1 J/g (JP-A-2-43206), and when the heat of fusion of the high-temperature-side peak of polypropylene resin pre-expanded particles falls within the range of 15 to 35 J/g (JP-A-5-179049 and JP-A-11-106550).

Like this, in case of conducting in-mold molding of polyolefin pre-expanded particles, it is required to define a parameter showing the crystal state of the resin, e.g., the heat of fusion of the high-temperature-side peak measured by differential scanning calorimetry, and to keep the parameter within a certain range. In practical in-mold foaming, a more preferable range is selected depending on the kind of resin, expansion ratio, molding method and the like. However, despite that the parameter falls within a preferable range, dimensional change of molded articles and molding cycle change occur and, therefore, it is hard to say that the foaming is controlled on a satisfactory level. Dimensional change results in generation of inferior products since the products do not have the required dimensions. Molding cycle change results in lowering of productivity since the production must be conducted at the longest molding cycle in order to avoid generation of inferior products.

It is an object of the present invention is to provide pre-expanded particles of a polyolefin resin which can be molded in a mold without causing molding cycle change to give cellular molded articles having a good dimensional stability.

A further object of the present invention is to provide a process for preparing polyolefin pre-expanded particles which can be subjected to in-mold foaming without causing molding cycle change and dimensional change of foaming products.

These and other objects of the present invention will become apparent from the description hereinafter.

SUMMARY OF THE INVENTION

It has now been found that the dimensional change and the molding cycle change are caused by variation in crystal state of pre-expanded particles and the above-mentioned objects can be achieved by minimizing the variation. It has also been found that polyolefin pre-expanded particles having a uniform crystal state can be prepared by carrying out the pressure release expansion method in such a manner that the temperature or pressure inside a pressure vessel is elevated with the lapse of time in the step of releasing a dispersion of resin particles impregnated with a blowing agent from the pressure vessel into a lower pressure zone.

Thus, in accordance with the present invention, there is provided a pre-expanded particle of a polyolefin resin wherein said pre-expanded particle shows two fusion peaks on a DSC curve when measured by differential scanning calorimetry (DSC) and the proportion of the heat of fusion of the peak appearing on the high temperature side based on the total heat of fusion of the two peaks represented by the equation: $[Qh/(Ql+Qh)] \times 100$ falls within the range of 10 to 60% in which Qh is the heat of fusion of the peak appearing on the high temperature side and Ql is the heat of fusion of the peak appearing on the low temperature side, and the standard deviation of said proportion is not more than 1.2.

The present invention also provides a process for preparing pre-expanded particles of a polyolefin resin.

In accordance with an embodiment of the present invention, there is provided a process for preparing pre-expanded particles of a polyolefin resin comprising the steps of charging polyolefin resin particles, an aqueous dispersion medium containing a dispersing agent and optionally a dispersing aid, and a blowing agent in a pressure vessel, heating the resulting dispersion with stirring to a prescribed pressure and a prescribed temperature to impregnate the resin particles with the blowing agent, and releasing the dispersion into a low pressure atmosphere to thereby expand the particles, wherein the inner temperature of the pressure vessel during the release is raised stepwise or continuously at a rate of 0.03 to 0.5° C. per 10 minutes.

In accordance with another embodiment of the present invention, there is also provided a process for preparing pre-expanded particles of a polyolefin resin comprising the steps of charging polyolefin resin particles, an aqueous dispersion medium containing a dispersing agent and optionally a dispersing aid, and a blowing agent having an effect of lowering the melting point of the polyolefin resin in a pressure vessel, heating the resulting dispersion with stirring to a prescribed pressure and a prescribed temperature to impregnate the resin particles with the blowing agent, and releasing the dispersion into a low pressure atmosphere to thereby expand the particles, wherein the inner pressure of the pressure vessel during the release is raised stepwise or continuously at a rate of 0.005 to 0.05 MPa per 10 minutes.

BRIEF DESCRIPTION OF THE DRAWING

FIG. 1 is a DSC curve obtained by differential scanning calorimetry of a polyolefin pre-expanded particle under the condition that the temperature is elevated from 40° C. to 220° C. at a rate of 10° C./minute, wherein tangent lines are drawn from the minimum point A of endotherm located between two fusion peaks toward the high temperature side and the low temperature side with respect to the DSC curve and the quantities of heat of the shaded portions enclosed by the DSC curve and each of the tangent lines are defined as the heat of fusion Ql of the low temperature side peak and the heat of fusion Qh of the high temperature side peak.

DETAILED DESCRIPTION

The polyolefin pre-expanded particles of the present invention have two fusion peaks measured by differential scanning calorimetry, wherein the ratio of the heat of fusion of the high temperature side peak to the total heat of fusion of the two peaks represented by the equation:

[Qh/(Ql+Qh)]×100 (this ratio being hereinafter referred to as "peak ratio") falls within the range of 10 to 60% in which Qh is the heat of fusion of the high temperature side peak and Ql is the heat of fusion of the low temperature side peak, and the standard deviation of the peak ratio is not more than 1.2.

In the present invention, the differential scanning calorimetry is carried out by using a usual differential scanning calorimeter (e.g., model DSC 6200 made by Seiko Instruments Inc.) with respect to a specimen prepared by pressing a pre-expanded particle of polyolefin resin at 60° C. into a sheet and allowing to cool at room temperature. The polyolefin pre-expanded particles of the present invention show two fusion peaks on a DSC curve obtained when elevating the temperature from 40° C. to 220° C. at a rate of 10° C./minute. It is preferable that the difference in temperature between the two fusion peaks is not less than 5° C., especially from 5 to 30° C. The heat of fusion Ql of the low temperature side peak and the heat of fusion Qh of the high temperature side peak are determined by drawing tangent lines, as shown in FIG. 1, from the minimum point A of endotherm located between two fusion peaks toward the high temperature side and the low temperature side with respect to the DSC curve. The quantities of heat of the shaded portions enclosed by the DSC curve and each of the tangent lines are defined as the heat of fusion Ql of the low temperature side peak and the heat of fusion Qh of the high temperature side peak.

The above-mentioned two peaks appear when a polyolefin resin is subjected to heat treatment in the vicinity of its melting point which changes the crystal structure to cause crystal growth. In general, the two peaks are obtained by using the pressure release expansion method as a method for preparing the pre-expanded particles and selecting appropriate expansion conditions in the pressure release expansion method.

The peak ratio [Qh/(Ql+Qh)]×100 is from 10 to 60%, preferably 18 to 40%. In general, if the peak ratio becomes lower, in-mold foaming of the pre-expanded particles can be carried out at a lower molding temperature to achieve good melt adhesion of particles and good appearance, but there are tendencies that the dimensional shrinkage of products becomes larger and the molding cycle becomes longer. To the contrary, if the peak ratio becomes larger, a higher molding temperature is needed to secure good melt adhesion and appearance, but the molding cycle tends to become shorter. In-mold foaming products having desired shape and appearance can be obtained at a desired molding cycle by adjusting the peak ratio of the pre-expanded particles within a suitable range depending on the kind and properties of a polyolefin resin used, the expansion ratio of pre-expanded particles, the molding method and the like. If the peak ratio is less than 10%, the dimensional shrinkage becomes too large, so the products are easy to deform after the molding of pre-expanded particles. If the peak ratio is more than 60%, melt adhesion and appearance are hard to be secured. As the impregnation of a blowing agent is carried out at a higher temperature when pre-expanded particles are prepared by the pressure release expansion method, the peak ratio becomes lower. Also, as the heat treatment time, e.g. impregnation time of blowing agent, becomes longer, the peak ratio tends to become higher since the crystal growth proceeds.

The standard deviation of the peak ratio of the polyolefin pre-expanded particles is not more than 1.2, preferably not more than 1.0. The standard deviation is obtained by randomly extracting 50 particles or more of polyolefin pre-expanded particles from the same production batch of a product, measuring and calculating the peak ratio of individual particles by DSC, and calculating from the peak ratio values according to the following equation:

$$\text{Standard deviation} = \sqrt{\frac{\sum_{i}^{n}(\bar{x} - x_i)^2}{n-1}}$$

wherein x is the average value.

Since there is a certain degree of variation in peak ratio of the pre-expanded particles, there is an individual difference in the obtained molding products of the pre-expanded particles. Therefore, molding products containing a large amount of pre-expanded particles having a high peak ratio and molding products containing a large amount of pre-expanded particles having a low peak ratio may be present. Also, there is a possibility that in a single molding product, pre-expanded particles having a high peak ratio or pre-expanded particles having a low peak ratio may partly localize. On the other hand, it is desirable for obtaining molding products having good melt adhesion and appearance to carry out the molding of pre-expanded particles at a molding temperature suitable for the respective peak ratios. However, it is not practical to change the molding temperature for each of the products in a continuation molding operation, and usually the molding is carried out at a molding temperature set rather high in conformity with pre-expanded having a high peak ratio. This results in over-heating for molding products containing a large amount of pre-expanded particles having a low peak ratio or for a portion composed mainly of pre-expanded particles having a low peak ratio, and such molding products have a large dimensional shrinkage or have partly a large dimensional shrinkage. Also, the molding cycle is not constant, since molding products of pre-expanded particles having a low peak ratio or portions of pre-expanded particles having a low peak ratio require a longer molding cycle.

For such reasons, it is important that the standard deviation of the peak ratio is not more than 1.2. If the standard deviation of the peak ratio is more than 1.2, it is difficult to stably produce cellular molded articles since the dimensional shrinkage and the molding cycle largely change due to a large difference in peak ratio of respective molded articles or in peak ratio of portions of a molded article.

The polyolefin pre-expanded particles of the present invention can be prepared by a pressure release expansion method wherein an aqueous dispersion of polyolefin resin particles impregnated with a blowing agent is released from a pressure vessel into an atmosphere of lower pressure than the inner pressure of the vessel to thereby expand the resin particles.

In case of industrially performing mass production of the polyolefin pre-expanded particles in accordance with the pressure release expansion method, the time of releasing an aqueous dispersion of resin particles impregnated with a blowing agent from a pressure vessel is generally from about 10 to about 300 minutes although it varies depending on the capacity of pressure vessel used, the charging ratio of resin particles into the pressure vessel, and the area of an orifice from which the dispersion is released into a lower pressure atmosphere. Even during the releasing of the dispersion, the polyolefin resin particles present in the vessel still suffers a heat treatment, resulting in crystal growth. Therefore, the peak ratio of the obtained pre-expanded particles rises as the releasing proceeds, and the peak ratio of the pre-expanded particles produced in the later stage of release is higher than those produced in the initial stage of release. In general, the product is a mixture of polyolefin pre-expanded particles produced during from the start to the end of the release. Thus, industrially mass-produced polyolefin pre-expanded particles have a large variation in peak ratio due to rise of peak ratio occurring with the lapse of releasing time. In case of polyolefin pre-expanded particles produced by a conventional pressure release expansion method, the standard deviation of the peak ratio is on the level of about 1.5 or more.

For minimizing the variation in peak ratio of polyolefin pre-expanded particles, it may be effective to shorten the releasing time. This may be attained by decreasing the amount of resin particles charged in a pressure vessel or by decreasing the capacity of the pressure vessel, but such a way has problems of lowering in productivity and increase in cost.

It has now been found that the rise in peak ratio of pre-expanded particles with the lapse of the releasing time can be suppressed by stepwise or continuously raising the inner temperature of a pressure vessel during releasing an aqueous dispersion of resin particles impregnated with a blowing agent from the pressure vessel into a lower pressure atmosphere without maintaining the inner temperature constant. The rate of raising the inner temperature is usually from 0.03 to 0.5° C., preferably 0.05 to 0.3° C., per 10 minutes, although it varies depending the kind of resin, the expansion conditions and the like. If the rate of temperature rise is less than 0.03° C., the effect of suppressing the rise in peak ratio accompanied by the lapse of releasing time is scarcely obtained. If the rate of temperature rise is more than 0.5° C., the peak ratio lowers with the lapse of releasing time, so the variation in peak ratio of the obtained pre-expanded particles becomes larger.

It has also been found that in case of using a blowing agent which has an effect of lowering the melting point of a polyolefin resin, the rise in peak ratio of pre-expanded particles with the lapse of the releasing time can also be suppressed by stepwise or continuously raising the inner pressure of a pressure vessel during releasing an aqueous dispersion of resin particles impregnated with the blowing agent from the pressure vessel into a lower pressure atmosphere without maintaining the inner pressure constant. The rate of raising the inner pressure is usually from 0.005 to 0.05 MPa, preferably from 0.01 to 0.03 MPa, per 10 minutes, although it varies depending the kind of resin, the kind of blowing agent, the expansion conditions and the like. If the rate of pressure rise is less than 0.005 MPa, the effect of suppressing the rise in peak ratio accompanied by the lapse of releasing time is scarcely obtained. If the rate of pressure rise is more than 0.05 MPa, the peak ratio lowers with the lapse of releasing time, so the variation in peak ratio of the obtained pre-expanded particles becomes large.

Examples of the polyolefin resin used in the present invention are, for instance, a polypropylene resin such as ethylene-propylene random copolymer, 1-butene-propylene random copolymer, ethylene-1-butene-propylene random terpolymer, ethylene-propylene block copolymer or propylene homopolymer; a polyethylene resin such as low density polyethylene, medium density polyethylene, high density polyethylene, linear low density polyethylene or ethylene-vinyl acetate copolymer; polybutene; polypentene; and the like. These may be used alone or in admixture thereof. Of these, ethylene-propylene random copolymer, 1-butene-propylene random copolymer, ethylene-1-butene-propylene random terpolymer and linear low density polyethylene are preferred from the viewpoint that polyolefin pre-expanded particles suitable for use in in-mold foaming are easily obtained.

The polyolefin resins are usually processed into a desired particulate shape so as to make it easier to use in pre-expansion, for example, by melting in extruder, kneader, Banbury mixer or mixing rolls, and forming into particles having a desired shape, such as column, prolate spheroid, sphere, cube or rectangular parallelepiped, and having an average particle size of 0.1 to 10 mm, preferably 0.5 to 5 mm. Ingredients optionally used, e.g., usual additives such as antioxidant, filler, process agent, nuclear agent, UV absorber, antistatic agent, slipping agent and pigment, are added usually to a molten resin in the course of the preparation of the resin particles.

Examples of the blowing agent to be impregnated into polyolefin resin particles are, for instance, a volatile blowing agent, e.g., an aliphatic hydrocarbon such as propane, butane, pentane, hexane or heptane and an alicyclic hydrocarbon such as cyclobutane, cyclopentane or cyclohexane; an inorganic gas such as carbon dioxide, nitrogen gas or air; water; and other known volatile organic blowing agents. These blowing agents may be used alone or in admixture thereof. In general, volatile organic blowing agents such as aliphatic hydrocarbon and alicyclic hydrocarbon have an effect of lowering the melting point of the resin.

The amount of the blowing agent is not limited, and is suitably selected according to a desired degree of expansion of the polyolefin pre-expanded particles to be produced. For example, in case of aliphatic and alicyclic hydrocarbons, the amount thereof is usually selected from the range of 5 to 50 parts by weight per 100 parts by weight of the polyolefin resin particles.

In the preparation of an aqueous dispersion of polyolefin resin particles, a dispersing agent and a dispersing aid are used. The dispersing agent includes, for instance, slightly water-soluble inorganic compounds such as calcium tertiary phosphate, basic magnesium carbonate and calcium carbonate. A small amount of a surfactant such as sodium dodecylbenzenesulfonate, sodium n-paraffinsulfonate or sodium α-olefinsulfonate is used as a dispersing aid. These compounds may be used alone or in admixture thereof.

The amounts of the dispersion agent and the dispersing aid vary depending on the kinds thereof and the kind and amount of the polyolefin resin particles used. Usually the amount of dispersing agent is from 0.1 to 5 parts by weight per 100 parts by weight of the resin, and the amount of dispersing aid such as surfactant is from 0 to 0.5 part by weight, preferably 0.001 to 0.5 part by weight per 100 parts by weight of the resin.

The aqueous dispersion medium used to prepare the aqueous dispersion of resin particles is typically water. The amount of water is preferably from 100 to 500 parts by weight per 100 parts by weight of the polyolefin resin particles in order to achieve good dispersion of the resin particles into water.

Usually polyolefin resin particles are introduced into a pressure vessel together with an aqueous dispersion medium and a blowing agent to form an aqueous dispersion of the particles, and impregnated with the blowing agent at an elevated temperature. The aqueous dispersion of the resin particles is heated up to a prescribed expansion temperature and a prescribed pressure in the pressure vessel. The expansion temperature varies depending on the kind of polyolefin resin particles used, the kind of blowing agent and the desired value of the peak ratio selected from the range of 10 to 60%, so it cannot be determined unconditionally. Usually the expansion temperature to which the aqueous dispersion is heated in the pressure vessel is selected within the range of about $(Tm-20)$ to about $(Tm+15)°$ C. wherein Tm is the melting point (° C.) of the polyolefin resin particles. In case of using a blowing agent having an effect of lowering the melting point of polyolefin resin such as aliphatic hydrocarbon or alicyclic hydrocarbon, good polyolefin pre-expanded particles are obtained at an expansion temperature on a lower side based on this effect.

The melting point Tm (° C.) of the polyolefin resin particles is measured by using an ordinary differential scanning calorimeter such as model DSC6200 made by Seiko Instruments Inc. as follows: Using 5 to 6 mg of polyolefin resin particles as a sample, the temperature is elevated from 40° C. to 220° C. at a rate of 10° C./minute to melt the resin particles, and after cooling the resin from 220° C. to 40° C. at a rate of 10° C./minute to crystallize the resin, the temperature is elevated again from 40° C. to 220° C. at a rate of 10° C./minute. From the DSC curve obtained when the second temperature elevation is conducted, the temperature corresponding to the fusion peak appearing on the DSC curve is measured as the melting point Tm.

The expansion pressure, namely the inner pressure of the pressure vessel at which the release of the aqueous dispersion is started, is selected primarily according to the desired expansion ratio, and is generally from 1.0 to 5.0 MPa.

There is no particular limitation in the pressure vessel used, and any of vessels can be used so long as it can withstand the pressures and temperatures as noted above. A representative vessel is an autoclave type pressure vessel.

The aqueous dispersion of the resin particles is heated up to a prescribed temperature and a prescribed pressure in the pressure vessel to impregnated the resin particles with a blowing agent, and is then released from the pressurized vessel into an atmosphere of lower pressure than the inner pressure of the vessel through an orifice having one or more openings with a diameter of 1 to 10 mm, thereby expanding the polyolefin resin particles by vaporization of the impregnated blowing agent to give the polyolefin pre-expanded particles. In the present invention, when releasing the aqueous dispersion, the inner temperature of the pressure vessel is raised continuously or in stages and/or the inner pressure of the pressure vessel is raised continuously or in stages if the blowing agent used has a melting point-lowering effect, whereby the pre-expanded particles of the present invention are obtained.

The polyolefin pre-expanded particles of the present invention have a bulk density of about 10 to about 300 kg/m$^3$, preferably about 15 to about 180 kg/m$^3$, and an expansion ratio of about 3 to about 90, preferably about 5 to about 60.

In case of subjecting the polyolefin pre-expanded particles of the present invention to in-mold foaming, the pre-expanded particles may be directly used in the in-mold foaming or may be pre-treated in a known manner, for example, by introducing an inorganic gas such as air or nitrogen gas into the pre-expanded particles under pressure to impart an expanding ability to the pre-expanded particles prior to filling them in a mold, or by filling the pre-expanded particles in a mold in the state of being compressed.

Production of foamed articles from the polyolefin pre-expanded particles of the present invention is carried out, for instance, in accordance with a conventional in-mold foaming method, by filling the pre-expanded particles in a mold capable of closing but incapable of hermetically sealing, heating the particles with a heating medium, for example, heating with steam of a pressure of about 0.05 to about 0.5 MPa for about 3 to about 30 seconds, to fuse them together, cooling the mold with water to cool the resulting molded article to the extent that the molded article taken out of the mold can be prevented from deforming, and opening the mold to obtain the cellular molded articles.

In an embodiment of the present invention, for example, ethylene-propylene random copolymer, 1-butene-propylene random copolymer, ethylene-1-butene-propylene terpolymer or linear low density polyethylene is processed by an extruder into columnar resin particles having an average diameter of 0.5 to 5 mm. The resin particles are charged into an autoclave together with, per 100 parts by weight of the resin particles, 5 to 50 parts by weight of a blowing agent such as propane, butane, pentane, carbon dioxide or air, 0.1 to 5 parts by weight of a dispersing agent such as calcium tertiary phosphate, 0 to 0.5 part by weight of a dispersing aid and 100 to 500 parts by weight of water. The resulting dispersion of the resin particles is heated to a temperature of $(Tm-20)$ to $(Tm+15)°$ C. wherein Tm is the melting point of the polyolefin resin particles used, and is pressurized to a pressure of 1 to 5 MPa by optionally introducing the blowing agent or the like into the pressure vessel, whereby the resin particles are impregnated with the blowing agent at such constant temperature and pressure. The aqueous dispersion of the resin particles impregnated with the blowing agent is then released from the autoclave to a lower pressure atmosphere through one or more openings having a diameter of 1 to 10 mm. During the release of the dispersion, the inner temperature of the autoclave is not maintained constant, but is elevated stepwise or continuously at a specified rate. In case that the blowing agent used has an effect of lowering the melting point of the resin, the inner pressure elevation procedure is also adaptable as well as the temperature elevation procedure. The inner pressure of the autoclave is elevated stepwise or continuously at a specified rate during the release of the dispersion. Thus, the polyolefin pre-expanded particles of the present invention are obtained.

In conventional processes for preparing pre-expanded particles, the inner temperature and inner pressure of the pressure vessel such as autoclave are generally maintained constant during releasing the aqueous dispersion of resin particles from the pressure vessel. In contrast, in the process of the present invention the inner temperature or the inner pressure of the pressure vessel is raised stepwise or continuously during the release, whereby the crystal growth (rise in peak ratio) which occurs during the release can be prevented to give pre-expanded particles, the change in peak ratio of which is very small from the start to the end of the release.

The variation in peak ratio of conventional polyolefin pre-expanded particles is large such that the standard deviation of the peak ratio is not less than 1.5, so the optimum molding cycle of in-mold foaming largely changes and the dimensional stability of the obtained in-mold foamed articles is not good. In contrast, the polyolefin pre-expanded particles of the present invention can be subjected to the in-mold foaming without these problems. It is possible to perform continuous production with a slight change in optimum molding cycle to provide in-mold foamed articles the dimensional change of which is very slight even if produced under constant production conditions.

The present invention is more specifically described and explained by means of examples and comparative examples, in which all parts are by weight unless otherwise noted. It is to be understood that the present invention is in no way limited to or by these examples. In the examples, evaluation was made according to the following methods.

(1) Peak Ratio

A particle of polyolefin pre-expanded particles was subjected to differential scanning calorimetry by using a differential scanning calorimeter model DSC 6200 made by Seiko Instruments Inc. and elevating the temperature from 40° C. to 220° C. at a rate of 10° C./minute. As shown in FIG. 1, tangent lines were drawn from the minimum point A of endotherm located between two fusion peaks appearing on the thus obtained DSC curve toward the high temperature side and the low temperature side with respect to the DSC curve. The quantities of heat corresponding to the shaded portions enclosed by the DSC curve and each of the tangent lines are defined as the heat of fusion Ql of the low temperature side peak and the heat of fusion Qh of the high temperature side peak. From the heats of fusion Ql and Qh, the ratio of the heat of fusion Qh of the high temperature side peak (peak ratio) was obtained according to the following equation:

Peak ratio (%)=[$Qh/(Ql+Qh)$]×100

With respect to a sample of polyolefin pre-expanded particles for determining the standard deviation of the peak ratio, 50 particles of the pre-expanded particles were randomly taken out of a bag of the pre-expanded particles which was randomly selected from a number of product flexible containers obtained from the same production batch. Each of 50 pre-expanded particles were pressed into a sheet-like form while heating in a thermostatic chamber of 60° C., allowed to cool at room temperature and subjected to the measurement.

The "peak ratio of product" shown in Table 1 denotes the average value of 50 particles.

The "rise in peak ratio with the lapse of releasing time" shown in Table 1 was calculated based on a difference in average peak ratio of 10 samples between a polyolefin pre-expanded particle released 5 minutes after starting the release and a polyolefin pre-expanded particle released 5 minutes before finishing the release.

(2) Melting Point

The melting point was measured by using a differential scanning calorimeter model DSC 6200 made by Seiko Instruments Inc. Using 5 to 6 mg of polyolefin resin particles as a sample, the temperature was elevated from 40° C. to 220° C. at a rate of 10° C./minute to melt the resin particles, and after cooling the resin from 220° C. to 40° C. at a rate of 10° C./minute to crystallize the resin, the temperature was elevated again from 40° C. to 220° C. at a rate of 10° C./minute. From the DSC curve obtained when the second temperature elevation was conducted, the temperature corresponding to the fusion peak appearing on the DSC curve was measured as the melting point.

(3) Expansion Ratio

The weight w (g) of about 2 g of dried polyolefin pre-expanded particles was exactly measured, and the particles were immersed in ethanol to measure the volume v ($cm^3$) of the particles from the increase of the volume of methanol. The expansion ratio was calculated according to the following equation wherein d is the density ($g/cm^3$) of polyolefin resin particles before expansion.

Expansion ratio=$d \times v/w$ (4) Cooling Time of Mold

In molding of polyolefin pre-expanded particles in a mold, after heating the pre-expanded particles to fuse them together, the mold was cooled with water. The time required for the pressure of the molded article surface against the mold surface (foaming pressure) to decrease to 0.05 MPa was measured as the mold cooling time.

The step which requires the longest time in the in-mold molding of pre-expanded particles is a step of cooling the mold with water. Since the cooling time largely varies depending on the quality of the pre-expanded particles, variation in molding cycle was evaluated based on the variation in mold cooling time according to the following criteria with respect to production of 100 molded articles.

○: Difference between the shortest cooling time and the longest cooling time is less than 10% with respect to the average cooling time.

Δ: Difference between the shortest cooling time and the longest cooling time is not less than 10% and less than 20% with respect to the average cooling time.

X: Difference between the shortest cooling time and the longest cooling time is not less than 20% with respect to the average cooling time.

(5) Dimensional Change

With respect to 100 in-mold foaming products obtained by thermally molding polyolefin pre-expanded particles in a mold, the dimensions of the molded articles were measured in the longitudinal, transverse and thickness directions. Variation in dimensional change was evaluated according to the following criteria:

○:Difference between the largest dimension and the smallest dimension is less than 3% with respect to the average dimension Δ: Difference between the largest dimension and the smallest dimension is not less than 3% and less than 5% with respect to the average dimension X: Difference between the largest dimension and the smallest dimension is not less than 5% with respect to the average dimension

EXAMPLE 1

To 100 parts of ethylene-propylene random copolymer (melting point 143.5° C., MI 6 g/10 minutes) was added 0.01 part of talc as a nucleating agent. The resulting mixture was kneaded by a 90 mmφ single screw extruder and formed into resin particles having a weight of 1.3 mg/particle.

A 14 m$^3$ pressure vessel was charged with 100 parts of the resin particles, 300 parts of an aqueous dispersion medium containing 2.0 parts of powdery basic calcium tertiary phosphate as a dispersing agent and 0.05 part of sodium n-paraffinsulfonate as a dispersing aid, and 18.9 parts of isobutane as a blowing agent. The inner temperature of the vessel was elevated to 136.6° C. The pressure inside the vessel was then adjusted to 2.11 MPa by introducing isobutane to the vessel. While adjusting the inner temperature and inner pressure of the vessel by the heating of the vessel and the introduction of isobutane gas, a valve provided at a lower part of the pressure vessel was opened and the aqueous dispersion medium was released together with the resin particles into atmospheric pressure through an orifice plate having openings therein of 3.6 mm diameter to give polyolefin pre-expanded particles. The releasing time was about 80 minutes. During the release, the inner temperature of the vessel was kept constant for initial 10 minutes and, thereafter, the inner temperature was raised by 0.2° C. and kept constant for 10 minutes, and was further repeatedly raised by 0.2° C. and kept constant for 10 minutes. The temperature rise operation was conducted in 6 stages in total, and after raising the inner temperature by 1.2° C. with respect to the initial inner temperature at the time of starting the release, the release was conducted at a constant temperature.

The properties of the thus obtained polyolefin pre-expanded particles are shown in Table 1.

The polyolefin pre-expanded particles were placed in a pressure vessel, and allowed to stand for 20 hours under an air pressure of 0.2 MPa in order to impart an expandability to the pre-expanded particles. The pre-expanded particles were then filled in a block mold having a size of 290×270× 40 mm, and heated with steam of 0.25 MPa for 8 seconds to fuse them together, thus giving in-mold foamed articles. With respect to 100 in-mold foamed articles, variation in cooling time and variation in dimensions were evaluated. The results are also shown in Table 1.

EXAMPLE 2

The procedure of Example 1 was repeated except that the inner pressure of the vessel was raised stepwise during releasing the aqueous dispersion medium containing resin particles instead of raising the inner temperature. During the release, the inner pressure of the vessel was kept constant for initial 10 minutes and, thereafter, the inner pressure was raised by 0.02 MPa and kept constant for 10 minutes, and was further repeatedly raised by 0.02 MPa and kept constant for 10 minutes. The pressure rise operation was conducted in 6 stages in total, and after raising the inner pressure by 1.2 MPa with respect to the initial inner pressure at the time of starting the release, the release was conducted at a constant pressure.

The results are shown in Table 1.

COMPARATIVE EXAMPLE 1

The procedure of Example 1 was repeated except that the inner temperature and the inner pressure of the vessel were kept constant during releasing the aqueous dispersion medium containing the resin particles. The results are shown in Table 1.

EXAMPLE 3

To 100 parts of ethylene-propylene random copolymer (melting point 146.5° C., MI 4 g/10 minutes) was added 0.01 part of talc as a nucleating agent. The resulting mixture was kneaded by a 90 mmφ single screw extruder and formed into resin particles having a weight of 1.8 mg/particle.

A 14 m$^3$ pressure vessel was charged with 100 parts of the resin particles, 300 parts of an aqueous dispersion medium containing 2.0 parts of powdery basic calcium tertiary phosphate as a dispersing agent and 0.05 part of sodium n-paraffinsulfonate as a dispersing aid, and 8.0 parts of isobutane as a blowing agent. The inner temperature of the vessel was elevated to 146.0° C. The pressure inside the vessel was then adjusted to 1.54 MPa by introducing isobutane to the vessel. While adjusting the inner temperature and inner pressure of the vessel by the heating of the vessel and the introduction of isobutane gas, a valve provided at a lower part of the pressure vessel was opened and the aqueous dispersion medium was released together with the resin particles into atmospheric pressure through an orifice plate having openings therein of 3.6 mm diameter to give polyolefin pre-expanded particles. The releasing time was about 120 minutes. During the release, the inner temperature of the vessel was continuously raised at a rate of 0.2° C. per 10 minutes. After raising the inner temperature by 2.0° C. with respect to the initial inner temperature at the time of starting the release, the release was conducted at a constant temperature.

The properties of the thus obtained polyolefin pre-expanded particles are shown in Table 1.

The polyolefin pre-expanded particles were placed in a pressure vessel, and allowed to stand for 20 hours under an air pressure of 0.2 MPa in order to impart an expandability to the pre-expanded particles. The pre-expanded particles were then filled in a block mold having a size of 290×270× 40 mm, and heated with steam of 0.35 MPa for 10 seconds to fuse them together, thus giving in-mold foamed articles. With respect to 100 in-mold foamed articles, variation in cooling time and variation in dimensions were evaluated. The results are also shown in Table 1.

EXAMPLE 4

The procedure of Example 3 was repeated except that the inner pressure of the vessel was raised during releasing the aqueous dispersion medium containing resin particles instead of raising the inner temperature. During the release, the inner pressure of the vessel was continuously raised at a rate of 0.02 MPa per 10 minutes, and after raising the inner pressure by 0.20 MPa with respect to the initial inner pressure at the time of starting the release, the release was conducted at a constant pressure. The results are shown in Table 1.

COMPARATIVE EXAMPLE 2

The procedure of Example 3 was repeated except that the inner temperature and the inner pressure of the vessel were kept constant during releasing the aqueous dispersion medium containing the resin particles. The results are shown in Table 1.

EXAMPLE 5

To 100 parts of linear low density polyethylene (melting point 124.0° C., MI 2 g/10 minutes) was added 0.01 part of talc as a nucleating agent. The resulting mixture was kneaded by a 90 mmφ single screw extruder and formed into resin particles having a weight of 1.8 mg/particle.

A 14 m$^3$ pressure vessel was charged with 100 parts of the resin particles, 300 parts of an aqueous dispersion medium containing 2.0 parts of powdery basic calcium tertiary phosphate as a dispersing agent and 0.05 part of sodium n-paraffinsulfonate as a dispersing aid, and 18.7 parts of isobutane as a blowing agent. The inner temperature of the vessel was elevated to 114.0° C. The pressure inside the vessel was then adjusted to 1.78 MPa by introducing isobutane to the vessel. While adjusting the inner temperature and inner pressure of the vessel by the heating of the vessel and the introduction of isobutane gas, a valve provided at a lower part of the pressure vessel was opened and the aqueous dispersion medium was released together with the resin particles into atmospheric pressure through an orifice plate having openings therein of 3.6 mm diameter to give polyolefin pre-expanded particles. The releasing time was about 120 minutes. During the release, the inner temperature of the vessel was continuously raised at a rate of 0.05° C. per 10 minutes. After raising the inner temperature by 0.5° C. with respect to the initial inner temperature at the time of starting the release, the release was conducted at a constant temperature.

The properties of the thus obtained polyolefin pre-expanded particles are shown in Table 1.

The polyolefin pre-expanded particles were filled in a block mold having a size of 290×270×40 mm, and heated with steam of 0.09 MPa for 10 seconds to fuse them together, thus giving in-mold foamed articles. With respect to 100 in-mold foamed articles, variation in cooling time and variation in dimensions were evaluated. The results are also shown in Table 1.

EXAMPLE 6

The procedure of Example 5 was repeated except that the inner pressure of the vessel was raised during releasing the aqueous dispersion medium containing resin particles instead of raising the inner temperature. During the release, the inner pressure of the vessel was continuously raised at a rate of 0.01 MPa per 10 minutes, and after raising the inner pressure by 0.10 MPa with respect to the initial inner pressure at the time of starting the release, the release was conducted at a constant pressure. The results are shown in Table 1.

COMPARATIVE EXAMPLE 3

The procedure of Example 5 was repeated except that the inner temperature and the inner pressure of the vessel were kept constant during releasing the aqueous dispersion medium containing the resin particles. The results are shown in Table 1.

EXAMPLE 7

To 100 parts of ethylene-propylene random copolymer (melting point 145.0° C., MI 4 g/10 minutes) was added 0.01 part of talc as a nucleating agent. The resulting mixture was kneaded by a 90 mmφ single screw extruder and formed into resin particles having a weight of 1.8 mg/particle.

A 4 m³ pressure vessel was charged with 100 parts of the resin particles and 300 parts of an aqueous dispersion medium containing 2.0 parts of powdery basic calcium tertiary phosphate as a dispersing agent and 0.05 part of sodium n-paraffinsulfonate as a dispersing aid. The inner temperature of the vessel was elevated to 154.0° C. The pressure inside the vessel was then adjusted to 2.54 MPa by introducing a nitrogen gas as a blowing agent to the vessel. Thereafter, while adjusting the inner temperature and inner pressure of the vessel by the heating of the vessel and the introduction of nitrogen gas, a valve provided at a lower part of the pressure vessel was opened and the aqueous dispersion medium was released together with the resin particles into atmospheric pressure through an orifice plate having openings therein of 3.6 mm diameter to give polyolefin pre-expanded particles. The releasing time was about 40 minutes. During the release, the inner temperature of the vessel was continuously raised at a rate of 0.2° C. per 10 minutes. After raising the inner temperature by 0.6° C. with respect to the initial inner temperature at the time of starting the release, the release was conducted at a constant temperature.

The properties of the thus obtained polyolefin pre-expanded particles are shown in Table 1.

The polyolefin pre-expanded particles were placed in a pressure vessel, and allowed to stand for 20 hours under an air pressure of 0.2 MPa in order to impart an expandability to the pre-expanded particles. The pre-expanded particles were then filled in a block mold having a size of 290×270×40 mm, and heated with steam of 0.40 MPa for 12 seconds to fuse them together, thus giving in-mold foamed articles. With respect to 100 in-mold foamed articles, variation in cooling time and variation in dimensions were evaluated. The results are also shown in Table 1.

COMPARATIVE EXAMPLE 4

The procedure of Example 7 was repeated except that the inner temperature and the inner pressure of the vessel were kept constant during releasing the aqueous dispersion medium containing the resin particles. The results are shown in Table 1.

TABLE 1

|  | Polyolefin resin | Blowing agent | Temperature difference between initial stage and final stage of releasing (° C.) | Pressure difference between initial stage and final stage of releasing (MPa) |
|---|---|---|---|---|
| Ex. 1 | Ethylene-propylene random copolymer | Isobutane | 1.2 | 0 |
| Ex. 2 | Ethylene-propylene random copolymer | Isobutane | 0 | 0.12 |
| Ex. 3 | Ethylene-propylene random copolymer | Isobutane | 2.0 | 0 |
| Ex. 4 | Ethylene-propylene random copolymer | Isobutane | 0 | 0.20 |
| Ex. 5 | Linear low density polyethylene | Isobutane | 0.5 | 0 |
| Ex. 6 | Linear low density polyethylene | Isobutane | 0 | 0.10 |
| Ex. 7 | Ethylene-propylene random copolymer | $N_2$ gas | 0.6 | 0 |
| Com. Ex. 1 | Ethylene-propylene random copolymer | Isobutane | 0 | 0 |

TABLE 1-continued

| | | | | | |
|---|---|---|---|---|---|
| Com. Ex. 2 | Ethylene-propylene random copolymer | Isobutane | | 0 | 0 |
| Com. Ex. 3 | Linear low density polyethylene | Isobutane | | 0 | 0 |
| Com. Ex. 4 | Ethylene-propylene random copolymer | $N_2$ gas | | 0 | 0 |

| | Expansion ratio (times) | Rise in peak ratio with the lapse of releasing time (%) | Peak ratio of product (%) | Standard deviation of peak ratio | Cooling time of mold | Dimensional change |
|---|---|---|---|---|---|---|
| Ex. 1 | 33.4 | 1.8 | 24.6 | 0.80 | ○ | ○ |
| Ex. 2 | 33.3 | 2.0 | 24.8 | 0.86 | ○ | ○ |
| Ex. 3 | 10.9 | 1.8 | 34.1 | 0.76 | ○ | ○ |
| Ex. 4 | 11.3 | 2.0 | 33.9 | 0.84 | ○ | ○ |
| Ex. 5 | 33.1 | 0.9 | 33.2 | 0.51 | ○ | ○ |
| Ex. 6 | 32.8 | 1.0 | 33.5 | 0.55 | ○ | ○ |
| Ex. 7 | 4.8 | 2.9 | 26.2 | 1.10 | Δ | ○ |
| Com. Ex. 1 | 33.7 | 4.5 | 24.8 | 1.53 | X | Δ |
| Com. Ex. 2 | 11.2 | 5.7 | 34.0 | 2.03 | X | X |
| Com. Ex.3 | 32.2 | 3.6 | 33.1 | 1.33 | Δ | Δ |
| Com. Ex. 4 | 4.9 | 5.6 | 22.8 | 1.95 | X | X |

From the results shown in Table 1, it is found that the polyolefin pre-expanded particles of the present invention obtained in Examples 1 to 7 which have a small variation in peak ratio, have the advantages that the variation in mold cooling time in molding processing is small and the variation in dimensions of cellular molded articles prepared therefrom is also small. In contrast, it is found that the polyolefin pre-expanded particles of Comparative Examples 1 to 4 prepared in a conventional manner have a large variation in peak ratio, and the variation in mold cooling time and the variation in dimensions of cellular molded articles are large.

In addition to the ingredients used in the Examples, other ingredients can be used in the Examples as set forth in the specification to obtain substantially the same results.

What we claim is:

1. A process for preparing pre-expanded particles of a polyolefin resin comprising the steps of charging polyolefin resin particles, an aqueous dispersion medium containing a dispersing agent and optionally a dispersing aid, and a blowing agent in a pressure vessel, heating the resulting dispersion with stirring to a prescribed pressure and a prescribed temperature to impregnate said resin particles with said blowing agent, and releasing said dispersion into a lower pressure atmosphere to thereby expand said particles, wherein the inner temperature of said pressure vessel is raised stepwise or continuously at a rate of 0.03 to 0.5° C. per 10 minutes during the release.

2. A process for preparing pre-expanded particles of a polyolefin resin comprising the steps of charging polyolefin resin particles, an aqueous dispersion medium containing a dispersing agent and optionally a dispersing aid, and a blowing agent having an effect of lowering the melting point of said polyolefin resin in a pressure vessel, heating the resulting dispersion with stirring to a prescribed pressure and a prescribed temperature to impregnate said resin particles with said blowing agent, and releasing said dispersion into a lower pressure atmosphere to thereby expand said particles, wherein the inner pressure of said pressure vessel is raised stepwise or continuously at a rate of 0.005 to 0.05 MPa per 10 minutes during the release.

* * * * *